Jan. 31, 1950 R. D. HEYMANN 2,495,721
HUNTER'S DECOY
Filed March 18, 1947 3 Sheets-Sheet 2
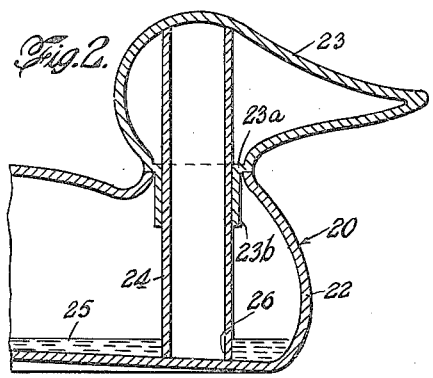
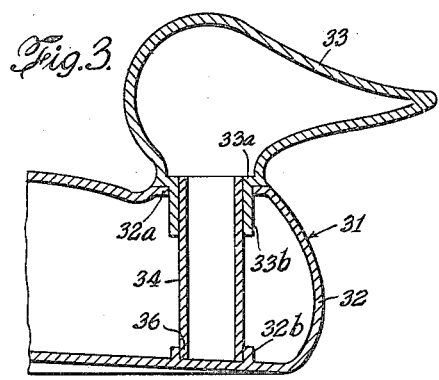
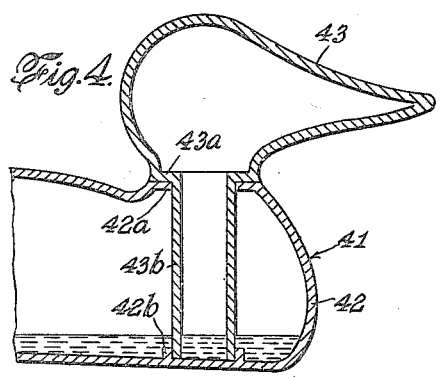
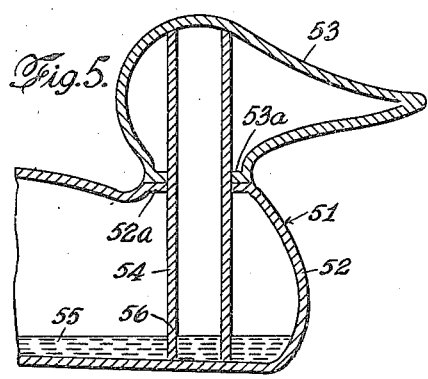
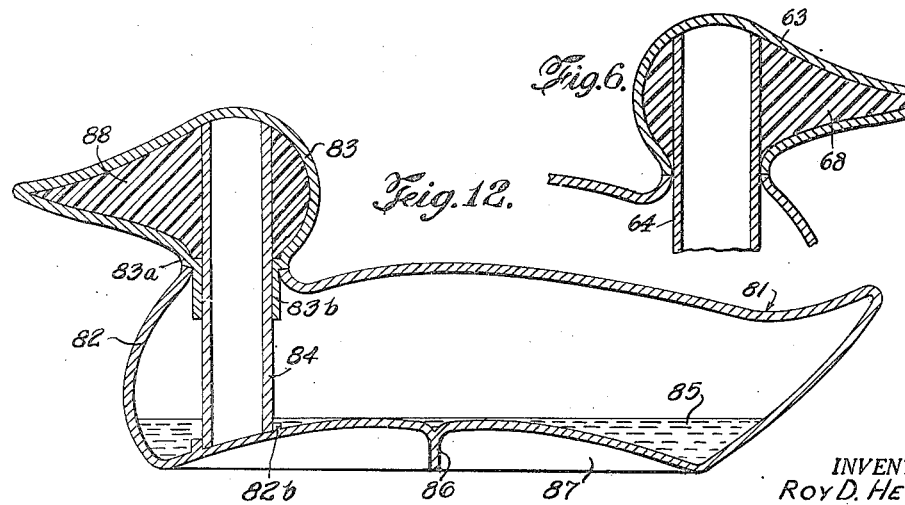
INVENTOR.
Roy D. Heymann
BY Robert E. Burns
ATTORNEY

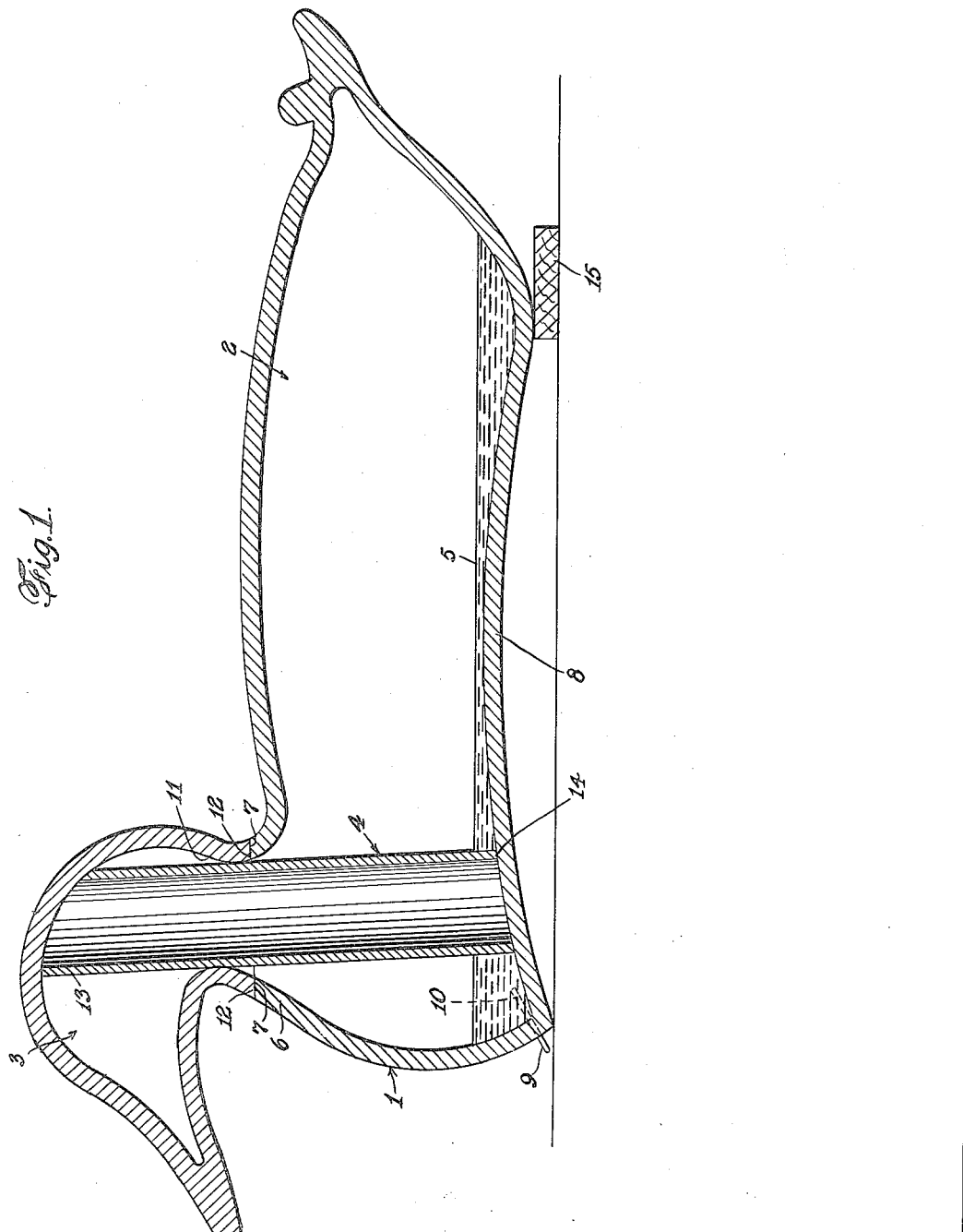

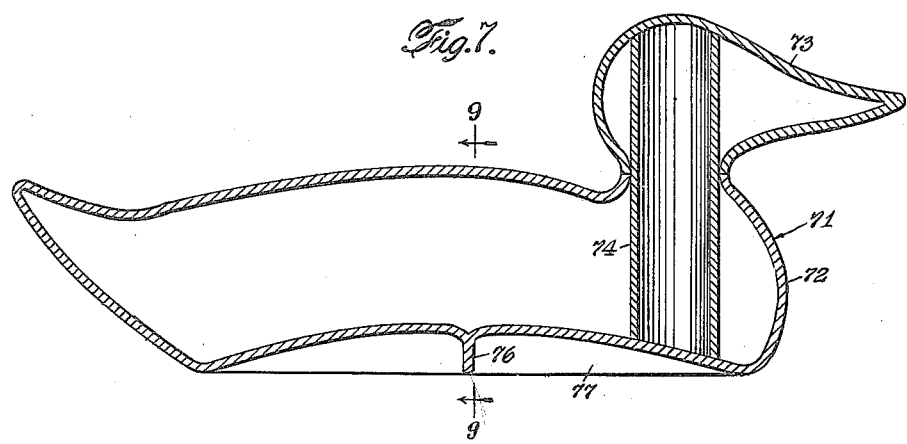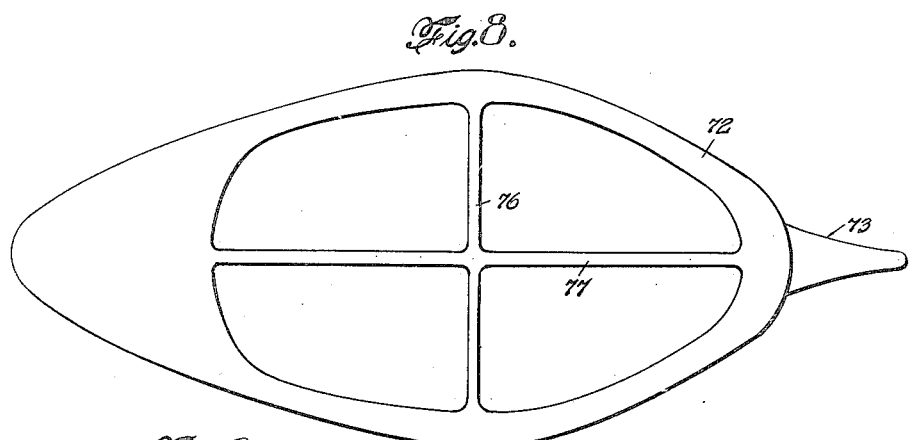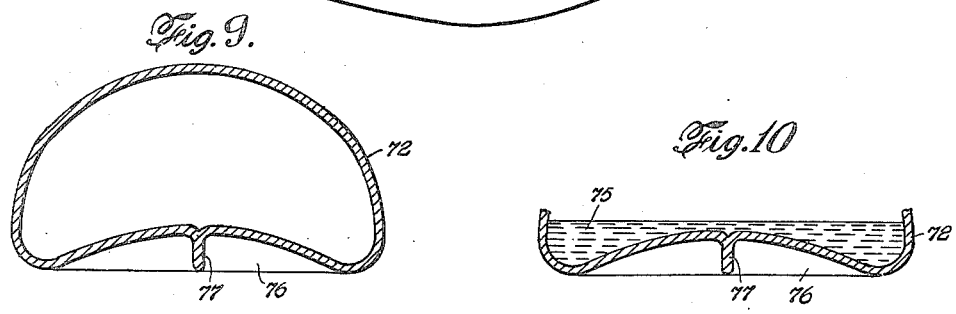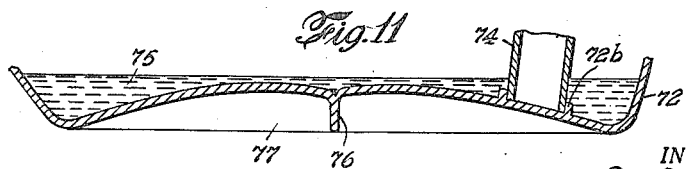

Patented Jan. 31, 1950

2,495,721

UNITED STATES PATENT OFFICE 2,495,721

HUNTER'S DECOY

Roy D. Heymann, New Hartford, Conn., assignor to Animal Trap Company of America, Lititz, Pa., a corporation of Pennsylvania Application March 18, 1947, Serial No. 735,479

17 Claims. (Cl. 43—3)

This invention relates to decoys used by hunters for leading water fowl to alight on water in the vicinity of the hiding place of the hunter. Such decoys are made in the semblance of the fowl which the hunter seeks to attract, for instance, ducks, geese, swans, etc. The decoys must be sufficiently buoyant to float in water with substantially the same trim as the live fowl. It is desirable that the decoys be as light in weight as possible in order to reduce the burden of transportation, as the bodies of water on which the decoys are used are usually remote from transportation facilities.

Heretofore light weight decoys have been made of hollow construction, such as by forming the body and head of the fowl in an open-bottomed shell closed with a bottom board. The shells also have been made of molded sheet metal, paste board, pulp, textile fabric, rubber, or other similar materials. However, such constructions are, in some cases, difficult and expensive to manufacture, or if made of light weight materials such as cast pulp, the decoys are easily damaged during transportation or use. A further disadvantage is that the decoys, because of their light weight in proportion to their bulk, have generally been exceedingly unstable and much difficulty has been experienced in providing a design which will remain in an upright position while floating. Various methods have been devised to add stabilizing ballast to such decoys, including the fastening of weights to the bottom of the decoy, molding heavy wooden panels into the bottom thereof together with various other makeshift arrangements for the purpose of lowering the center of gravity by increasing the weight in the base or bottom portion. However, due to the thin wall section of the decoys and the character of the material used, none of these methods have proved satisfactory. Moreover, the methods of applying the added weight have utilized constructions resulting in leakage and subsequent sinking of the decoy.

An object of the present invention is to provide an improved hollow decoy which is light in weight, rugged in construction and stable in floatation.

The present invention overcomes the difficulties and disadvantages of prior devices and accomplishes the foregoing objects by providing a lightweight, hollow decoy formed in head and body portions separately cast as integral units. Materials which are to be used for reinforcing the parts, for impregnating the structure internally and to ballast the body are introduced into the hollow spaces in the parts. The inner surface of the bottom of the body is formed to distribute the ballast in an effective manner whereby stability is provided with a minimum of ballast material. Greater stability results from a lowered center of gravity provided by the novel design. The construction lends itself to accurate and uniform balancing under factory production conditions and eliminates any need for individual balancing as heretofore has been necessary with decoys of this type. The ballast, by providing a coating over the bottom of the decoy, improves the water resistance of the shell and eliminates the need for cumbersome outside weights which tend to become fouled in underwater vegetation. By providing an anchoring means molded in the ballast material, the opening therefor is automatically sealed, and the anchoring stress is distributed over the area of the bottom of the body by the ballast material. Further, by providing a decoy composed of separable body and head portions, the positioning of the head with respect to the body may be varied during the assembly process, producing decoys more lifelike in appearance.

For a better understanding of the present invention reference may be made to the following description and to the accompanying drawings in which:

Fig. 1 is a sectional elevated view of a decoy in accordance with the invention showing a reinforcing tube extending through the neck of the decoy. The decoy is shown in a tilted position in which the solidifiable ballast material is allowed to become set to secure the anchoring means and the bottom of the reinforcing tube in position.

Fig. 2 is a fragmentary sectional elevational view showing the head portion having an extension tube with a reinforcing tube extending through the head and body portions.

Fig. 3 is a view corresponding to Fig. 2 showing a reinforcing tube extending from the neck of the head portion to the bottom of the body portion. This view also shows an annular protuberance in the bottom of the body portion for supporting the lower end of the reinforcing tube.

Fig. 4 is a view somewhat similar to Fig. 3 showing a reinforcing tube integral with the head of the decoy.

Fig. 5 is a view similar to Fig. 3 showing a head and body portion each formed with a sealing surface at the neck joint and a reinforcing tube in place.

Fig. 6 shows a head and an extension tube extending to the outside of the top thereof with a solidifiable material in the beak extending to engage the reinforcing tube.

Fig. 7 is a sectional elevational view of a decoy having a generally concaved bottom with reinforcing members.

Fig. 8 is a bottom view of the decoy shown in Fig. 7 illustrating the longitudinally and transversely extending reinforcing members.

Fig. 9 is a cross sectional view taken along the line 9—9 of Fig. 7.

Fig. 10 is a fragmentary view of the section shown in Fig. 9 illustrating the flat top surface of the ballast material and the distribution of same.

Fig. 11 is a fragmentary longitudinal sectional view of a decoy similar to that shown in Fig. 7 illustrating the ballast material in position.

Fig. 12 is a longitudinal section of another embodiment.

Referring to the embodiments of my invention illustrated in the drawings, there is shown by way of example in Fig. 1 a decoy simulating a duck. It is to be understood, however, that the decoy may also be made in a form to imitate any other species of water fowl or the like. The decoy 1 comprises a body portion 2, a head portion 3, a reinforcing tube 4, and ballasting material 5.

The body and head portions are made separately in hollow formations of pulp cast in suitable molds. The molds may be of the type commonly used for casting pulp having appropriate internal contours shaped to form the outer surface of the castings into the semblance of folded wings, plumage and other surface characteristics of the fowl. The molds are foraminous for the escape of the water in which the pulp fibers are suspended, and for the passage of the air which is later introduced into the hollow castings to evaporate residual water. The body portion 2 is molded as an integral one-piece shell with its only opening in the upper portion of the body. There are hence no openings in the bottom or lower portion of the body through which water can enter. The opening 6 in the upper portion of the body serves the multiple purpose of admitting pulp to the mold during the molding operation, introducing ballasting material into the body portion to assure the desired "trim" and, in the embodiment illustrated in the drawings, also provides for attachment of the head portion 3 which seats on the edge 7 of the opening 6 and serves as a closure of the opening. In forming the body portion the pulp is preferably flowed into the mold while the mold is supported in an inclined position with the neck end at a considerably higher elevation than the tail end. Consequently, the pulp fibers are deposited to a somewhat greater thickness adjacent to the tail end of the body to aid in compensating for the weight of the head in giving the desired floating trim to the decoy. The bottom 8 of the body in the form shown in Fig. 1 is concave in contour. An anchoring connection is shown in the form of a metal staple 9 having prongs 10 extending through the shell of the body into the hollow space therein. While a staple is shown, it is understood that a screw eye, ring, hook, loop or similar construction may be used instead as the anchoring connection. The prongs 10 of the staple 9 are held in place by the ballasting material 5 which not only seals the opening made by the staple but distributes a stress placed on the anchoring connection throughout the entire bottom surface of the decoy. The ballast material may be any suitable solidifiable material such as tar, pitch, asphalt, or other thermoplastic, or a solid material such as sand or gravel covered with a coating of liquid cement, resin or other material adapted to act as a binder for the solid material.

The head portion 3 is made from a mold of the desired contour, and like the body portion is molded from pulp in an integral unit. By being molded separately from the body the head can be more accurately shaped and can, if desired, be molded with different wall thickness. It is desirable in some cases to mold the head with the beak portion in the lower mold position so that a somewhat heavier deposit of pulp will add to the strength of the long thin beak portion. The head portion is likewise made with an opening 11 at the neck thereof formed with a flat surface 12 for engagement with the body portion.

The reinforcing tube 4 is used to provide a connecting means between the head and the body portions and provides a rugged construction permitting the carrying of the decoy by using the head as a handle. The external diameter of the tube 4 corresponds to the internal diameter of the neck opening of the decoy. The upper end 13 is shaped to conform to the inner side of the head portion 3, while the lower end 14 is made with a square end to fit the inside of the bottom 8 of the decoy.

In assembling the decoy, the body portion is placed in a predetermined tilted position, for example, by resting the tail end on a block 15. A measured amount of ballast in molten or fluid-like form is poured in through neck opening 6. Waterproof cement is applied between the points of contact of the parts. Head portion 3 and reinforcing tube 4 are placed in position and the ballast material allowed to set in place. It will be evident that this construction makes it possible to turn the decoy head at any desired lateral angle during the assembly process with the result that a more life-like appearance is achieved in a group of decoys as they are commonly used.

In Figs. 2 through 6 are various constructions in accordance with the invention in which reinforcing means are provided for attaching the head portion to the body portion. In the decoy 20 partially shown in Fig. 2 the body portion 22 is constructed in like manner as the body portion 2 of Fig. 1. Head portion 23 is provided at the neck end thereof with an annular seat 23a providing on its lowermost side a seating surface for engaging with the body portion 22. Depending from the annular seating surface 23a is a stem 24a having an inner surface adapted to receive reinforcing tube 24. In this construction an additional surface is provided for making an adhesive joint between the head and the reinforcing tube through the stem 23b. In assembling this decoy the lower end 26 of reinforcing tube 24 is molded in ballast material 25 as previously described.

In the decoy 31 partially shown in Fig. 3, body portion 32 is provided at the neck end thereof with an annular seating surface 32a. Head portion 33 is provided at the neck opening thereof with an annular seating surface 33a from which depends the stem 33b. The body portion 32 is provided with an annular protuberance 32b positioned opposite the neck opening thereof. This protuberance has a diameter adapting it to receive end 36 of a reinforcing tube 34 adapted to extend from the bottom of the decoy through stem 33b. Another form of reinforcing construction is shown in Fig. 4 in which there is partially shown a decoy 41 having a body portion 42 provided with an annular seating surface 42a at the neck opening thereof and an annular protuberance 42b opposite the neck opening of the body portion. Head portion 43 is provided with an annular seating surface 43a having a depending stem 43b adapted to extend to the bottom of the body portion of the decoy and being engaged by protuberance 42b. In this form of construction assembly is easier in that there are only two parts to be put together. Adhesive material may be placed between the annular surfaces 42a and 43a to provide a seal. Another form of reinforcing construction is shown in Fig. 5 in which the decoy 51 is provided with a body portion having an annular seating surface 52a at the neck opening thereof. Head portion 53 has an annular seating surface 53a adapted to coact with annular seating surface 52a of the body portion. A reinforcing tube 54 extends from the inner side of the head portion to the inner side of the bottom, snugly fitting the neck portion of the head and body. End 56 is shown molded in place in ballast material 55.

A construction is shown in Fig. 6 in which the head portion is reinforced by a light weight solidifiable material, for example, a bubbled plastic material. In this construction, the head 63 is provided with beak portion 67 filled with light weight solidifiable material 68 which is extended backward into the head to contact reinforcing tube 64. The material 68 reinforces the head and provides a strong union between the head and the tube 64.

In Figs. 7 through 11 there is shown a decoy 71 formed of separate body portion 72 and head portion 73. The bottom of the body portion is made of a shape to provide greater stability in flotation and to distribute the molded ballast to better advantage. The shape of the bottom is designed to cause the ballast material to mass in such a position that a lesser amount of ballast is required to properly stabilize the decoy. In accordance with this form of the invention the ballast material 75 is concentrated as much as possible in the position most remote from the projection of the center of gravity of the unbalanced decoy on the bottom thereof, thus providing a moment arm for the stabilizing mass permitting balance with a lesser weight of material. Body portion 72 has a bottom generally internally convex the exact shape of the bottom depending upon variations in the size, shape and weight of materials used in the construction. In this particular embodiment a somewhat larger space is provided for ballast material in the rearward portion of the decoy than in the forward portion in order to compensate for the weight of the head and tube. The distribution of the ballast is clearly shown in Figs. 10 and 11, which reveal the recesses above the side walls for the ballast material. The mass of the material is thus located away from the center line and below the central portion of the bottom. The bottom is reinforced by intersecting ribs or webs 76 and 77 which divide the external concavity formed by the dome shaped bottom into a plurality of separate pockets or recesses. The junction between the head and the body portion is preferably reinforced by means of a reinforcing tube as illustrated in any of Figs. 1 to 6. In Fig. 11 the lower end of a reinforcing tube 74 is shown as being seated in a protuberance 72b and embedded in the ballast material 75.

Fig. 12 illustrates a further embodiment of my invention which combines some features illustrated in the preceding figures. In Fig. 12, there is shown a decoy 81 comprising a one-piece body portion 82 and a one-piece head portion 83. The neck portion of the head is provided with an annular seat or shoulder 83a and a downwardly projecting tubular extension 83b. A reinforcing tube 84 extends down through the neck portion of the head 83 and, at its lower end, fits into an annular projecting portion 82b formed on the inside of the bottom wall of the body. The lower end of the tube is also held by ballast material 85. The bottom wall of the body portion is outwardly concave and is provided with a transverse web 76 and longitudinal web 77, as in Figs. 7 and 11. The head portion of the decoy contains a light weight solidifiable material, as in Fig. 6, which fills the beak portion and extends around at least a portion of the tube 84 so as to form a strong union between the head and the tube.

The body and head are coated or impregnated with any suitable hardening substance, such as vein resin, casein, etc., coated with a water repellant paint, resin, or plastic, of which many suitable varieties are known to the art. Internal impregnation or coating may be accomplished by entering the material through the neck opening of the respective parts.

An exterior coating material may be provided in different colors and applied so as to imitate the coloring of a specific species of fowl.

This application is a continuation-in-part of my application Serial No. 586,650, filed April 5, 1945.

While the invention has been described and illustrated with reference to specific embodiments thereof, it will be understood that other embodiments may be resorted to without departing from the invention. It will be apparent that the features shown in the several figures are mutually interchangeable. For example, the head reinforcing means of Fig. 7 and the bottom construction of Figs. 7 to 11 are applicable also to the embodiments illustrated in the other figures. Likewise, the anchoring means shown in Fig. 1 is applicable to all of the embodiments. Therefore, the form of the invention set out above should be considered as illustrative and not as limiting the scope of the following claims.

What I claim and desire to secure by Letters Patent is:

1. In a buoyant decoy having an integral hollow cast pulp body including a bottom wall and an integral hollow cast pulp head separable at the neck of the decoy, a hollow reinforcing tube extending from the inside of the bottom of the body into neck portion of the hollow head, said reinforcing tube snugly fitting the inside of the body and the inside of the head at the neck portion of the decoy and means for non-rotatably anchoring the lower end of the tube to the bottom wall of the body.

2. In a buoyant decoy having body and head portions separable at the neck thereof, a hollow head portion formed in one piece of a cast pulp, said head portion at the neck end thereof having an inwardly turned annular seating surface adapted to fit on the body portion said seating surface having an inwardly depending cylindrically shaped portion, and a separate reinforcing tube snugly fitting the inside of said cylindrical portion of said head and extending into the body portion.

3. In a buoyant decoy having body and head portions separable at the neck thereof, a hollow head portion formed in one piece of a cast pulp, said head portion at the neck end having integral therewith an inwardly turned annular seating surface and a depending cylindrically shaped portion extending down inside of said body portion, a tubular extension telescopically fitting said cylindrical portion and extending down to the bottom of the body portion, and means for anchoring the lower end of said extension to said bottom.

4. In a buoyant decoy having body and head portions, separable at the neck thereof, a hollow head portion formed in one piece of a cast pulp, said head portion at the neck end adapted to seat on the body portion and a separate reinforcing tube adapted to extend from the underside of the top of the head to the inner side of the bottom of the body.

5. In a buoyant decoy having body and head portions, a hollow body portion formed in one piece of a cast pulp, said body portion having a raised annular configuration on the inside of the bottom thereof under the head opening; and a reinforcing tube extending from said body portion through the neck thereof into the head portion anchored by said annular configuration.

6. In a buoyant decoy having separable body and head portions, a hollow body portion formed in one piece of a cast pulp, said body portion having a raised annular configuration on the inside of the bottom thereof under the head opening, a reinforcing tube extending from said body portion through the neck thereof into the head portion, and solidifiable ballast material in the bottom of said body portion, said tube being anchored in said configuration by said solidifiable ballast material.

7. In a buoyant decoy, a hollow cast pulp body, a separate hollow head portion formed in one piece of cast pulp, a reinforcing tube extending downwardly from said head portion through the neck thereof, solidifiable material molded into the beak of the head and engaging the said tube and means for anchoring the lower end of said tube to the bottom of the body to hold it against tilting.

8. A hunter's decoy made of cast pulp for use on water comprising a one-piece body made of a hollow shell having its only opening at the neck of the body, a one-piece head likewise made of cast pulp adapted to fit on said body, a reinforcing tube extending through the neck of the decoy from the underside of the top of the head to the inner side of the bottom of the body, the beak of said head being filled with a light-weight solidifiable material to reinforce same, said material extending around at least a portion of said tube in said head, the bottom of said body being weighted with an internal ballast of solidifiable material, and anchoring means extending through said body near the bottom thereof and embedded in said ballast.

9. A hunter's decoy made of cast pulp for use on water comprising a one-piece body made of a hollow shell having its only opening at the neck of the body, a one-piece head likewise made of cast pulp adapted to fit on said body covering said neck opening, a hollow reinforcing tube extending through the neck of the decoy from above the junction point of the neck and the head to the inner side of the bottom of the body, the beak of said head being filled with a light-weight solidifiable material to reinforce same, the bottom of said body being weighted with an internal ballast of solidifiable material, the lower end of said tube being embedded in the ballast, and anchoring means extending through said body near the bottom thereof and embedded in said ballast.

10. A hunter's decoy made of cast pulp for use on water comprising a one-piece body made of a hollow shell having its only opening at the neck of the body, a one-piece head likewise made of cast pulp as a hollow shell having a tubular extension adapted to fit into said body opening, to hold the head in place on said body, a hollow reinforcing tube extending through the extension of said head and through the neck of the decoy from the underside of the top of the head to the inner side of the bottom of the body, the beak of said head being filled with a light-weight solidifiable material to reinforce same, said material extending around at least a portion of said tube, the bottom of said body being generally internally convex and outwardly concave, the shape of the bottom being such as to provide a larger recess towards the rear thereof, the front portion of the inner side of the bottom of the body being provided with an upwardly projecting ring-shaped portion to receive the lower end of said reinforcing stem, the exterior of said bottom being reinforced by a transverse web and a longitudinally extending web, said webs intersecting at the center of said bottom, the bottom of said body being weighted with an internal ballast of solidifiable material, and anchoring means extending through said body near the bottom thereof and embedded in said ballast.

11. A hunter's decoy made of cast pulp comprising a one-piece body made of a hollow shell having its only opening at the neck of the body, a one-piece head likewise made of cast pulp as a hollow shell having a tubular extension adapted to fit into said body opening to hold the head in place on said body, and a hollow reinforcing tube extending through the extension of said head to the inner side of the bottom of the body, the beak of said head being filled with a light-weight solidifiable material to reinforce same, the bottom of said body being generally internally convex and outwardly concave, the shape of the bottom being such as to provide a larger recess towards the rear thereof, the front portion of the inner side of the bottom of the body being provided with an upwardly projecting ring-shaped portion to receive the lower end of said reinforcing stem, the exterior of said bottom being reinforced by a transversely extending web and a longitudinally extending web intersecting at the center of said bottom, the bottom of said body being weighted with an internal ballast of solidifiable material.

12. A hunter's decoy made of cast pulp comprising a one-piece body made of a hollow shell having its only opening at the neck of the body, and a one-piece head likewise made of cast pulp as a hollow shell having a tubular extension adapted to fit into said body opening and extend to the inner side of the bottom of the body to hold the head in place on said body, the head being filled with a light-weight solidifiable material to reinforce same, the bottom of said body being generally internally convex and outwardly concave, the shape of the bottom being such as to provide a larger recess towards the rear thereof, the front portion of the inner side of the bottom of the body being provided with an upwardly projecting ring-shaped portion to receive the lower end of said tubular extension of the head, the exterior of said bottom being reinforced by a transversely extending web and a longitudinally extending web intersecting at the center of said bottom and a solidifiable ballast material inside said body stabilizing the body and holding said extension tube in position in said body.

13. A hunter's decoy made of cast pulp comprising a one-piece body made of a hollow shell having its only opening at the neck of the body, a one-piece head likewise made of cast pulp as a hollow shell having an opening at the neck thereof and adapted to fit into place on said body, a reinforcing tube adapted to fit into said neck opening of said body and into said neck opening of said head and extend to the inner side of the bottom of said body, the beak of said head being filled with a light-weight solidifiable material to reinforce same, the bottom of said body being generally internally convex and outwardly concave, the shape of the bottom being such as to provide a larger recess towards the rear thereof, the front portion of the inner side of the bottom of the body being provided with an upwardly projecting ring to receive the lower end of said tubular extension, the exterior of said bottom being reinforced by a transversely extending web and a longitudinally extending web intersecting at the center of the bottom, and a solidifiable ballast material inside said body stabilizing the body when placed in water and holding the lower end of said tube in place.

14. A buoyant water fowl decoy comprising a hollow one-piece cast pulp body portion having a neck opening surrounded by an annular seating surface, a hollow one-piece cast pulp head and neck portion, said neck portion terminating in an annular surface of substantially the same size and shape as the annular seating surface of the body, a tubular portion fitting closely inside the neck portion and extending down to the bottom of the body portion, and solidified ballast material in the bottom portion of the body, the lower end of said tubular portion being embedded in and held by said ballast material.

15. A buoyant water fowl decoy comprising a hollow one-piece body portion having a neck opening surrounded by an annular seating surface, a hollow one-piece head and neck portion having a neck opening surrounded by an annular surface seating on said annular surface of the body, a tubular portion fitting inside the neck portion and adhesively secured thereto, said tubular portion extending downwardly to the bottom of the body portion and having its lower end adhesively secured to said bottom.

16. A buoyant water fowl decoy comprising a hollow one-piece cast pulp body portion having integral top, side and bottom walls and having as its only opening a neck aperture surrounded by an annular seating surface, a hollow one-piece head and neck portion, a tubular portion extending downwardly from said neck portion to the bottom of the body portion, said neck portion having an annular seating surface surrounding said tubular portion and seating on the annular seating surface of the body, and solidified ballast material in the bottom portion of the decoy, the lower end of said tubular portion being embedded in said ballast.

17. A buoyant water fowl decoy comprising a hollow one-piece molded pulp body portion having integral top, side and bottom walls and having as its only opening a neck aperture surrounded by an annular seating surface, a hollow one-piece head and neck portion, a tubular portion rigid with said head and neck portion and extending downwardly through said neck aperture to the bottom of the body portion, said neck portion having an annular seating surface surrounding said tubular portion and seating on the annular seating surface of the body, and means for fixedly anchoring the lower end of said tubular portion to the bottom wall of the body.

ROY D. HEYMANN.

REFERENCES CITED

The following references are of record in the file of this patent:

UNITED STATES PATENTS

| Number | Name | Date |
|---|---|---|
| 351,709 | Nye | Oct. 26, 1886 |
| 987,059 | Frampton | Mar. 14, 1911 |
| 1,328,317 | Claussen | Jan. 20, 1920 |
| 1,697,465 | Kempf | Jan. 1, 1929 |
| 2,201,164 | Fox | May 21, 1940 |
| 2,247,450 | Olsen | July 1, 1941 |
| 2,391,475 | Newhardt | Dec. 25, 1945 |
| 2,413,418 | Rulison | Dec. 31, 1946 |
| 2,453,758 | Risch | Nov. 16, 1948 |

FOREIGN PATENTS

| Number | Country | Date |
|---|---|---|
| 327,063 | Great Britain | Mar. 27, 1930 |